United States Patent
Hattori et al.

[11] Patent Number: 5,873,382
[45] Date of Patent: Feb. 23, 1999

[54] FLOAT VALVE DEVICE

[75] Inventors: Toshio Hattori, Sagamihara; Junya Ohno, Atsugi, both of Japan

[73] Assignees: Nissan Motor Co., Ltd.; Nifco Inc., both of Yokohama, Japan

[21] Appl. No.: 789,986

[22] Filed: Jan. 28, 1997

[30] Foreign Application Priority Data

Jan. 29, 1996 [JP] Japan .................................... 8-013010

[51] Int. Cl.⁶ ................................................. F16K 24/04
[52] U.S. Cl. ............................................. 137/202; 137/43
[58] Field of Search ...................................... 137/43, 202

[56] References Cited

U.S. PATENT DOCUMENTS

| | | | |
|---|---|---|---|
| 2,414,908 | 1/1947 | Smith | 251/333 |
| 4,982,757 | 1/1991 | Ohasi et al. | 137/202 |
| 5,028,244 | 7/1991 | Szlaga | 55/170 |
| 5,413,137 | 5/1995 | Gimby | 137/43 X |
| 5,573,030 | 11/1996 | Ohsaki et al. | 137/202 X |
| 5,577,526 | 11/1996 | Kasugai et al. | 137/43 X |
| 5,590,697 | 1/1997 | Benjey et al. | 137/202 X |
| 5,598,870 | 2/1997 | Nagino | 137/202 |
| 5,632,296 | 5/1997 | Kasugai et al. | 137/43 |
| 5,638,856 | 6/1997 | Ohsaki | 137/202 |

*Primary Examiner*—Gerald A. Michalsky
*Attorney, Agent, or Firm*—Foley & Lardner

[57] ABSTRACT

A float valve device for a fuel tank of an automotive vehicle. The float valve device comprises a valve body installed to an upper wall of the fuel tank. The valve body is formed thereinside with a communication passage for establishing communication between inside and outside of the fuel tank. A valve mouth member is fixedly disposed inside the communication passage and includes a lower end section having a peripheral portion defining thereinside a valve opening which forms part of the communication passage. A float is disposed inside the valve body and movable relative to the valve opening in accordance with a level of the liquid in the fuel tank. A rubber member is securely disposed at an upper section of the float. The rubber member has a sealing face which is substantially flat and contactable with the peripheral portion of the valve mouth member to close the valve opening upon ascending of the float.

12 Claims, 2 Drawing Sheets

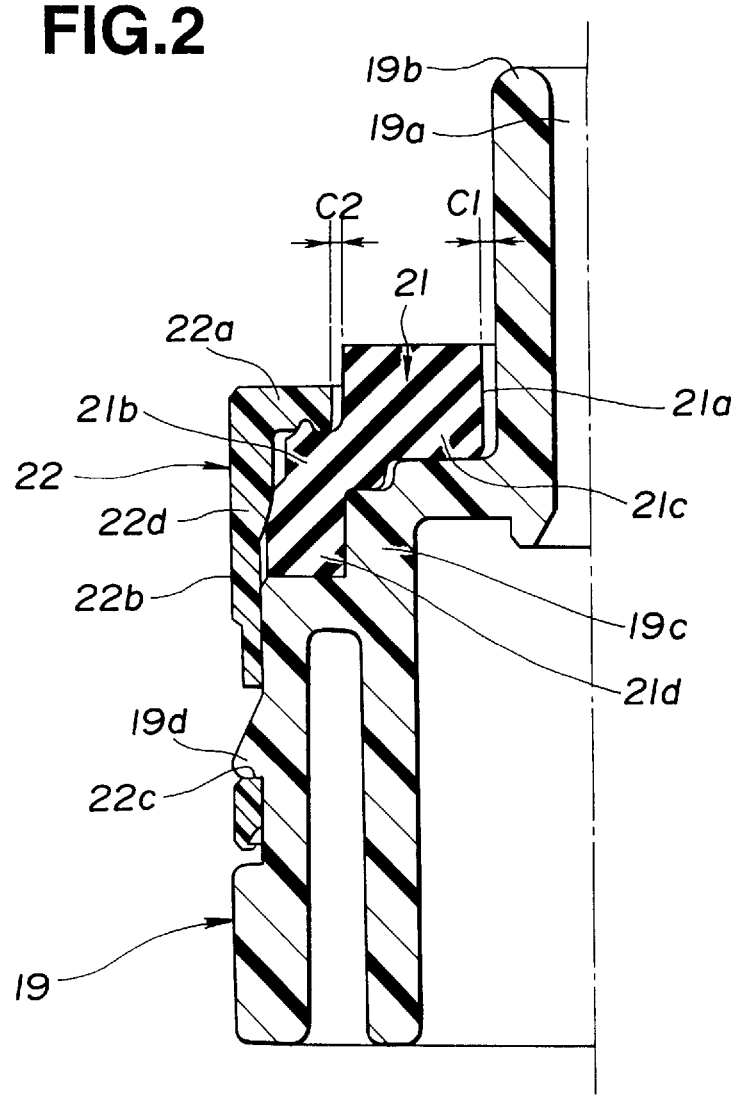
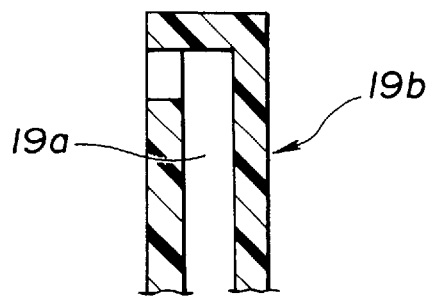

FLOAT VALVE DEVICE

BACKGROUND OF THE INVENTION

1. Field of the Invention

This invention relates to improvements in a float valve device which is adapted to make gas venting in a container for a liquid and to stop the gas venting when the liquid level reaches to a predetermined level.

2. Description of the Prior Art

Hitherto float valve devices have been known to be used with a container for a liquid in order to make gas venting of the container for a liquid and to stop the gas venting when the liquid level reaches to a predetermined level. A typical one of them is disclosed in U.S. Pat. No. 5,028,244 and arranged as follows: A float valve device is installed to the upper wall section of a fuel tank. During supply of fuel into the fuel tank, air and fuel gas within the fuel tank is vented out of the fuel tank and introduced into a carbon canister. When the fuel level in the fuel tank has reached a predetermined level, a float ascends to close a valve opening thereby stopping gas venting, thereby maintaining the fuel level to the predetermined level while preventing fuel leak to the side of the carbon canister even under shaking of the fuel level during vehicle turning or the like.

However, drawbacks have been encountered in the above-discussed conventional float valve device which is arranged such that the valve opening is closed upon contacting of the upper section of the ascending float with a peripheral portion of the valve opening. The upper section of the float and the peripheral portion of the valve opening are made of plastic and therefore makes a rigid contact therebetween (at a contacting or sealing surface), thereby making it impossible to accomplish a sufficient liquid tight seal. Additionally, the sealing surface between the upper section of the float and the peripheral portion of the valve opening is generally spherical thereby providing the following shorcomings: It is difficult to obtain a high fitting precision at the sealing surface, and also difficult to maintain a right spherical surface after the sealing surface has been subjected to various loads during operation of the float valve device. Furthermore, the spherical sealing surface will wear and deform under repeated operations of the float valve device. Moreover, if there is a misalignment between the axes of the opposite faces constituting the sealing surface, no sufficient sealing at the sealing surface can be obtained.

SUMMARY OF THE INVENTION

It is an object of the present invention to provide an improved float valve device which can effectively overcome drawbacks encountered in conventional float valve devices.

Another object of the present invention is to provide an improved float valve device which is high in liquid tight seal ability between the upper section of a float and a peripheral portion defining thereinside a valve opening when the float ascends upon rising of the level of a liquid in a container.

A further object of the present invention is to provide an improved float valve device which includes a float whose upper section is formed with a flat sealing face, the sealing face forming part of a rubber member and being contactable with a peripheral portion defining thereinside a valve opening.

A float valve device of the present invention is for a container containing liquid and comprises a valve body installed to an upper wall section of the container. The valve body is formed with a communication passage for establishing communication between inside and outside of the container. A valve mouth member is fixedly disposed inside the communication passage and includes a lower end section having a peripheral portion defining thereinside a valve opening which forms part of the communication passage. A float is disposed inside the valve body and movable relative to the valve opening in accordance with a level of the liquid in the container. A rubber member is securely disposed at an upper section of the float. The rubber member has a sealing face which is substantially flat and contactable with the peripheral portion of the valve mouth member to close the valve opening upon ascending of the float.

With the thus arranged float valve device, when liquid is supplied into the container, gas within the container flows into the valve body and is vented through the valve opening of the valve mouth member to the outside of the container thereby accomplishing gas venting. When the liquid level rises to a predetermined level, liquid flows into the valve body so that the float ascends under buoyant force. Accordingly, the sealing face of the rubber member is brought into contact with the peripheral portion of the valve opening so as to close the valve opening, thus stopping the gas venting. In this case, the seal surface section is softer than plastic and therefore high in sealing ability to the peripheral portion defining the valve opening in a condition where the seal surface section is in contact with the peripheral portion. Additionally, the sealing face of the seal surface section is flat thereby providing the following advantages: It is easy to obtain a high fitting precision at the sealing surface between the seal surface section and the peripheral portion defining the valve opening. Deformation is hardly made at the sealing surface between the seal surface section and the peripheral portion even under application of load input. Further, uniform wear will be made at the sealing surface even under repeated operations of the float valve device. Furthermore, the high fitting precision at the sealing surface can be maintained even if the axes of the seal surface section and the peripheral portion are misaligned from each other.

BRIEF DESCRIPTION OF THE DRAWINGS

FIG. 2 is an enlarged vertical sectional view of an essential part of the float valve device of FIG. 1; and FIG. 3 is an enlarged fragmentary vertical sectional view of a modified example of an essential part of the float valve device of FIG. 1.

DETAILED DESCRIPTION OF THE INVENTION

Figure 1:
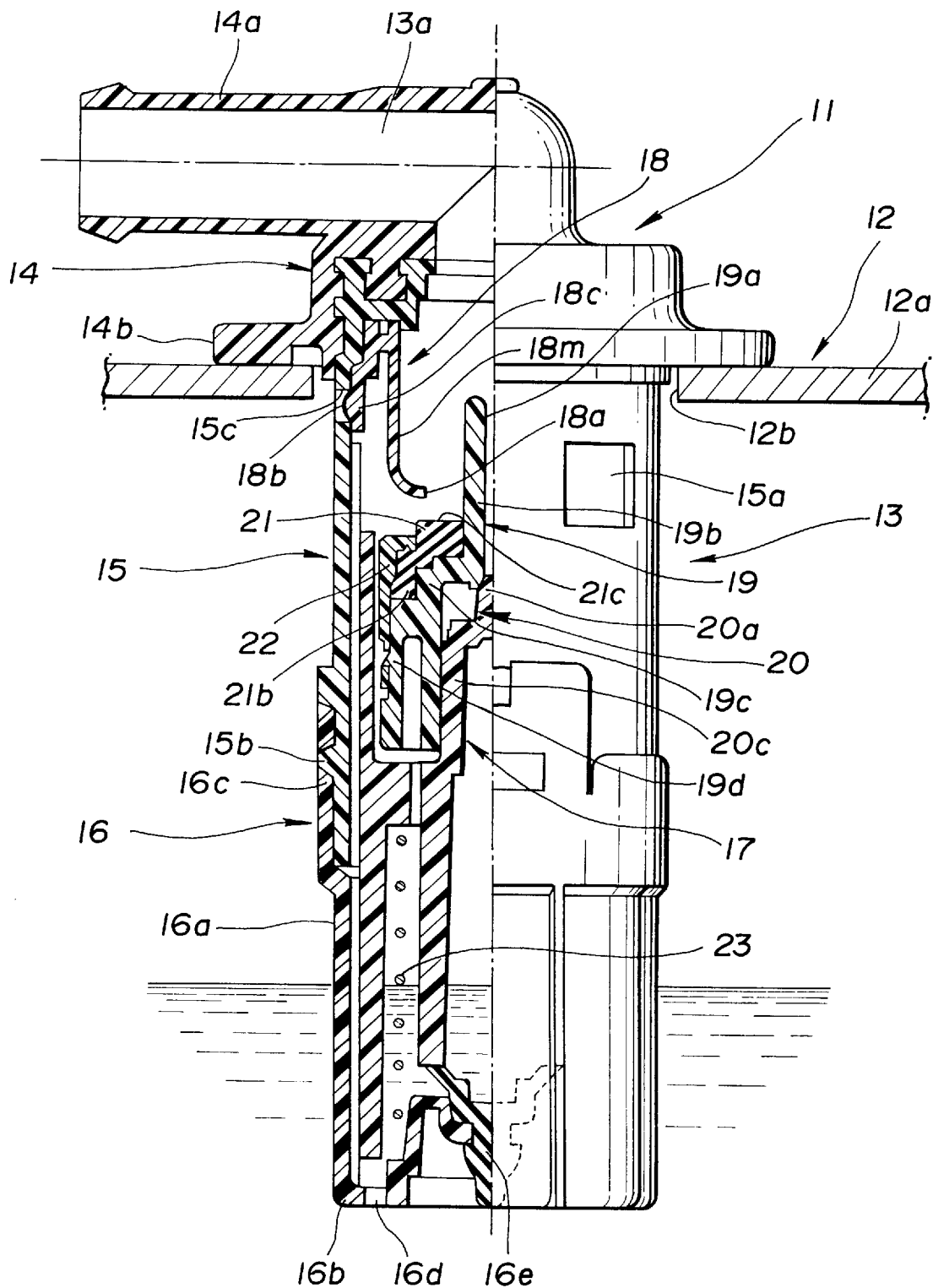
FIG. 1 is a front elevation, partly in section, of an embodiment of a float valve device according to the present invention.

Referring now to FIGS. 1 and 2, a preferred embodiment of a float valve device according to the present invention is illustrated by the reference numeral 11. The float valve device 11 of this embodiment is disposed to a fuel tank 12 of an automotive vehicle. Specifically, the float valve device 11 is installed to an upper wall section 12a of the fuel tank 12 in such a manner that a major part thereof is inside the fuel tank 12 while the other part is outside the fuel tank 12.

The float valve device 11 comprises a valve body 13 which consists of three components, i.e., an upper member 14, an intermediate member 15 and a lower member 16. The upper member 14 is made of polyethylene like the fuel tank 12 and located projected out of the fuel tank upper wall section 12a. The upper member 14 is provided with a pipe section 14a which is to be connected to a carbon canister (not shown), and with a flange section 14b which is fixed onto the upper wall section 12a of the fuel tank 12 in a manner to maintain a fluid-tight seal to the fuel tank upper wall section 12a. The intermediate member 15 is generally cylindrical and made of polyacetal, and fixed at its upper portion to the upper member 14. The intermediate member 15 is formed with several air inflow openings 15a located aligned along the periphery of the intermediate member 15. The lower member 16 is also made of polyacetal and includes a cylindrical section 16a. A bottom section 16b is formed integral with the cylindrical section 16a. The cylindrical section 16a has an engagement opening 16c located at the upper portion thereof. A projecting section 15b formed at the lower part of the intermediate member 15 is detachably engaged with the engagement opening 16c of the lower member 16. The bottom section 16b of the lower member 16 is formed with a plurality of communication holes 16d through which the inside and outside of the valve body 13 are in communication with each other. The communication holes 16d are aligned along the periphery of the cylindrical section 16a. An elastic member 16e is disposed at the central part of the bottom section 16b in a manner to support a float 17 which will be discussed after.

With the thus arranged float valve device 11, the inside and outside of the valve body 13 are in communication with each other through the communication holes 16d and the air inflow openings 15a. Additionally, the inside of the valve body 13 is in communication with the carbon canister through the pipe section 14a. As a result, a communication passage 13a is formed through the valve body 13 to establish communication between the inside and outside of the fuel tank 12.

Additionally, a valve mouth member 18 is detatchably disposed in the communication passage 13a of the valve body 13 and adapted to be closable with a float 17. The valve mouth member 18 is made of polyacetal and includes a generally cylindrical main body 18m which is formed converged toward its lower which has an annular peripheral portion defining thereinside a valve opening 18a. This valve opening 18a is closable with the float 17. The valve mouth member main body 18m is provided with a generally frustoconical engaging piece 18c located around the main body 18m. The engaging piece 18c has engaging projections 18b which are formed on the peripheral surface thereof and detatchably enagagable in engaging holes 15c formed in the intermediate member 15 of the valve body 13. It will be understood that the valve mouth member 18 can be gotten out of the upper member 14 by releasing the engaging state of the engaging projections 18b to the engaging holes 15c.

The float 17 includes an outer cylinder 19 which has a pipe or orifice section 19b formed with an orifice 19a which is smaller in diameter than the valve opening 18a. The orifice 19a is formed at the upper part of the outer cylinder 19 and generally along the axis of the outer cylinder 19. A closing member 20 is provided such that the orifice 19b of the outer cylinder 19 is closable therewith under its vertical movement. The orifice section 19b of the outer cylinder 19 extends upward into the inside of the valve mouth member main body 18m through the valve opening 18a. A rubber member 21 is disposed around the orifice section 19b and located facing the lower end of the valve mouth member 18. The rubber member 21 is generally annular so as to have an insertion or central opening 21a in which the orifice section 19b is coaxially disposed. The rubber member 12 includes an annular installation section 21b which is disposed around and at the upper part of the outer cylinder 19. An annular seal surface section 21c is formed integral with the installation section 21b and located above the installation section 21b. An annular tapered section 21d is formed integral with the installation section 21b and located below the installation section 21b. The tapered section 21d has a tapered surface which is tapered in an upward direction. The installation section 21b and the tapered section 21d are installed or fitted to a step section 19c of the outer cylinder 19 in a manner to surround the step section 19c.

An installation member 22 is fitted around the installation section 21b and the tapered section 21d of the rubber member 21 to fix the rubber member 21 in position. Specifically, the installation member 22 is generally ring-shaped and has a generally L-shaped cross-section upon cutting in half along a plane containing the axis thereof as clearly shown in FIG. 2. The installation member 22 includes a horizontally extending annular disc section 22a, and a generally cylindrical section 22d which vertically extends and integral with the outer peripheral portion of the disc section 22a. The cylindrical section 22b is formed at its upper part with a tapered section 22d which has a tapered surface in press contact with the tapered surface of the tapered section 21d of the rubber member 21. The cylindrical section 22d is further formed at its lower part with engaging holes 22c in which engaging projections 19d of the outer cylinder 19 are respectively fitted. The rubber member 21 can be prevented from its vertical movement under the pressing action of the disc section 22a of the installation member 22 and prevented from its horizontal movement under the pressing action of the cylindrical section 22d. Additionally, the rubber member 21 can be prevented from getting out of its position under the action of the tapered section 21d of the rubber member 21, the step section 19c of the outer cylinder 19 and the tapered section 22d of the installation member cylindrical section 22b. As a result, even if the installation section 21b of the rubber member 21 is deformed upon fitting of the installation member 22, the seal surface section 21c is maintained in a state having no deformation. The seal surface section 21c is formed at its top surface with a sealing face (no numeral) which is to be brought into sealing contact with the lower end of the cylindrical main body 18m of the valve mouth member 18 which lower end has the annular peripheral portion defining thereinside the valve opening 18a, so that the valve opening 18a is closable with the sealing face of the seal surface section 21c. Additionally, an annular clearance C1 is formed between the inner peripheral surface of the seal surface section 21c of the rubber member 21 and the outer peripheral surface of the pipe or orifice section 19b of the outer cylinder 19. An annular clearance C2 is formed between the outer peripheral surface of the seal surface section 21c of the rubber member 21 and the inner peripheral surface of the disc section 22a of the installation member 22. By virtue of these clearances C1, C2, the sealing face of the seal surface section 21c can be prevented from being deformed even if the seal surface section 21c is swelled.

The closing member 20 includes an inner cylindrical section 20c which is slidably fitted inside the outer cylinder 19. The closing member 20 has a projection section 20a located at the top thereof and adapted to close the orifice 19a of the outer cylinder 19. A spring 23 is disposed between the closing member 20 and the bottom section 16b of the lower member 16. A lower end section of the closing member 20 is supported by the elastic member 16e in a condition where the float 17 is descending.

The manner of operation of the float valve device 11 will be discussed.

When fuel is supplied to the fuel tank 12, air and fuel vapor within the tank 12 flows through the air inflow opening 15a into the valve body 13 and then flows through the valve opening 18a into the inside of the pipe section 14a to be introduced to the side of the carbon canister thereby accomplishing gas venting of the fuel tank 12.

When the liquid level of fuel has risen to a predetermined high level, fuel flows into the inside of the valve body 13 through the communication holes 16d at the bottom section 16d of the lower member 16. Then, the float 17 ascends under the buoyant force, and therefore the sealing face of the seal surface section 21c of the rubber member 21 is brought into sealing contact with the annular peripheral portion of the valve mouth member cylindrical main body 18m defining the valve opening 18a thereby closing the valve opening 18a. As a result, a gas venting state of the fuel tank is interrupted, and supply of fuel into the fuel tank 12 is stopped at the predetermined level of fuel.

At this time, the sealing ability of the sealing face of the seal surface section 21c of the rubber member 21 to the peripheral portion defining the valve opening 18a is high and improved because the seal surface section 21c is formed of rubber which is soft as compared with plastic. Under a condition in which the rubber member 21 is installed in position upon fitting the installation member 22, the installation section 21b of the rubber member 21 is stably kept in position upon being compressed vertically with the disc section 22a of the installation member 22 and upon being compressed horizontally with the cylindrical section 22b of the installation member 22. Accordingly, the seal surface section 21c of the rubber member 21 is in an installed state where it cannot deform even if the side of the installation section 21b is deformed. Thus, the flatness of the sealing face of the seal surface section 21c can be effectively maintained thereby providing a high sealing ability. Besides, the rubber member 21 may be swelled in fuel; however, no excessive force is applied to the seal surface section 21c of the rubber member by virtue of the clearances C1, C2. Accordingly, the sealing face of the seal surface section 21c can be prevented from deformation, thereby maintaining the flat state of the sealing face of the seal surface section 21c. Thus, the high sealing ability of the rubber member 21 can be achieved also from this view point.

When the fuel level of the fuel tank 12 has descended upon fuel consumption, the float 17 descends by its weight so that the sealing face of the sealing surface section 21c of the rubber member 21 is separate from the annular lower end peripheral portion (defining the valve opening 19b) of the cylindrical main body 18m of the valve mouth member 18. Thus, the valve opening 19b is opened. In case that the pressure within the fuel tank 12 has risen over a predetermined level, fuel vapor is introduced toward the carbon canister.

It will be understood that the gas venting efficiency of the fuel tank 12 is higher while making a smoother fuel supply operation during fuel supply to the fuel tank 12 as the valve opening 18a of the valve mouth member 18 is larger. Additionally, when the fuel level in the fuel tank 12 has lowered in a condition where the valve opening 18a is closed with the float 17, it is better to allow the valve opening 18a to open quickly in order to make a gas venting so as to suppress a pressure rise in the fuel tank 12. In order to meet these requirements, the float valve device 11 of this embodiment is arranged as follows: The float 17 includes the outer cylinder 19 having the orifice section 19b, and the closing member 20. More specifically, when the fuel level in the fuel tank 12 lowers from the condition where the valve opening 18a has been closed, the outer cylinder 19 and the closing member 20 of the float 17 descend as a single member to open the valve opening 18a in case that the pressure within the fuel tank 12 is not so high. However, in case that a pressure difference between the side of the fuel tank 12 and the side of the carbon canister is relatively large, the outer cylinder 19 is brought into a condition to be pressed on the side of the valve opening 18a under the action of the pressure difference, because the valve opening 18a is formed large. Here, the outer cylinder 19 is formed with the small orifice 19a and closed with the closing member 20 at this time; however, a force (due to the pressure difference) by which the closing member 20 is thrust into the orifice 19a is relatively small because the orifice 19a is small in diameter. Accordingly, even in the condition where the outer cylinder 19 has been pressed onto the side of the valve opening 18a, the closing member 20 can descend by its weight thereby to open the orifice 19a. Then, gas in the fuel tank 12 is vented to the side of the carbon canister, and therefore the pressure difference is reduced. As a result, a force by which the outer cylinder 19 is pressed on the side of the valve opening 19b is lowered so as to allow the valve opening 18a to be wholly opened thereby accomplishing gas venting of the fuel tank 12.

Additionally, the orifice section 19b of the outer cylinder 19 is extended upward to have an upper end opening located within the main body 18m of the valve mouth member 18. Consequently, the upper end opening of the orifice section 19b is hardly dipped in fuel even if the fuel level in the fuel tank 12 is shaken, for example, under vehicle turning or the like, thus preventing the orifice 19a from being clogged with dust and the like drifting on the surface of fuel in the fuel tank 12. In this connection, if the upper end opening of the orifice 19a is directed laterally as shown in FIG. 3, fuel can enter the orifice 19a only from one direction even when the surface of fuel in the fuel tank 12, thereby further effectively preventing the orifice 19a from being clogged with dust and the like.

Further, it will be understood that it is usual to make the intermediate member 15 and the lower member 16 of the valve body 13 of a material which is rigid to some extent because they have respective engaging structures or portions, whereas the valve mouth member 18 is separate from the valve body 16 and therefore made of a material (such as nylon) which is softer than that of the valve body 13. This will further improve a sealing ability between the valve mouth member 18 and the float 17. Besides, the valve mouth member 18 is detachable relative to the valve body 13 and therefore replaceable with that having a different height. Accordingly, a fuel level at which gas venting is stopped can be adjusted in conformity with difference in automotive vehicle kinds and with specification change of the automotive vehicles, thereby adjusting the fuel level, for example, in a fuel tank filled state.

While the float valve device has been shown and described as being of the type installed to the fuel tank in the above embodiment, it will be appreciated that the principle of the float valve device of the present invention may be applied to other float valve devices to be used with containers other than the fuel tank.

What is claimed is:

1. A float valve device for a container containing liquid, comprising;
    a valve body installed on an upper wall section of the container, said valve body including a communication passage for establishing communication between an inside and an outside of the container;
    a valve mouth member fixedly disposed inside the communication passage and including a lower end section having a peripheral portion defining thereinside a valve opening which forms part of the communication passage;

a float disposed inside said valve body and movable relative to the valve opening in accordance with a level of liquid in the container;

a rubber member securely disposed at an upper section of said float, said rubber member having a sealing face which is substantially flat and contactable with the peripheral portion of said valve mouth member to close the valve opening upon ascension of said float, said rubber member being generally annular and including an annular installation section securely mounted on an upper section of said float, and an annular seal surface section integral with and located above said installation section, the seal surface section being located around the upper section of said float and comprising the sealing face; and a generally annular installation member disposed around said installation section of said rubber member to fix said installation section to the upper section of said float, said installation member being separate from and secured to said float, wherein the installation member is located so that an upper part of said seal surface section of said rubber member projects beyond said installation member toward said valve mouth member, and said seal surface section is located radially inwardly of said installation member.

2. A float valve device as claimed in claim 1, wherein said rubber member is spaced from said valve mouth member peripheral portion to allow the valve opening to be opened to vent gas in the container through the communication passage, and said rubber member is contactable with said valve mouth member peripheral portion to close the valve opening to stop venting of gas in the container when the level of liquid in the container reaches a predetermined level.

3. A float valve device as claimed in claim 1, wherein said float includes an outer cylinder having an axially extending orifice formed therein, said orifice extending through a central opening of said rubber member and being located inside said valve mouth member, and a closing member which is vertically movable inside said outer cylinder and engagable with said outer cylinder, the orifice of said outer cylinder being closable with said closing member.

4. A float valve device as claimed in claim 1, wherein said valve mouth member is separate from said valve body and detachably installed inside said valve body.

5. A float valve as claimed in claim 1, wherein said rubber member is installed when the installation member fixes the installation section of the rubber member to the float, and the sealing face remains undeformed upon deformation of the installation section during installation of said rubber member.

6. A float valve device as claimed in claim 5, wherein the seal surface section of said rubber member is located such that an annular clearance is formed between an outer peripheral surface of the upper section of said float and an inner peripheral surface of said seal surface section.

7. A float valve device as claimed in claim 1, wherein said installation member includes an annular section located around the seal surface section of said rubber member, and wherein an annular clearance is formed between an outer peripheral surface of the seal surface section of said rubber member and an inner peripheral surface of said annular section of said installation member.

8. A float valve devise as claimed in claim 1, wherein the lower end section of the valve mouth member curves toward a longitudinal axis of the float valve device as it extends to an extreme end toward the rubber member of the float valve, and the valve opening is formed at the extreme end of the lower end section.

9. A float valve device for a container containing liquid, comprising;

a valve body installed on an upper wall section of the container, the valve body including a communication passage for establishing communication between an inside and an outside of the container;

a valve mouth member disposed inside the communication passage and including a lower end section having a peripheral portion defining thereinside a valve opening which forms part of the communication passage;

a float disposed inside the valve body and movable relative to the valve opening in accordance with a level of liquid in the container; and a rubber member securely disposed upon the float, the rubber member having a sealing face which is substantially flat and contactable with the peripheral portion of the valve mouth member to close the valve opening, the rubber member being generally annular and including an installation section securely mounted on the float, and a seal surface section integral with and spaced from the installation section along an axial direction of the float, the seal surface section comprising the sealing face, wherein an installation member fixes the installation section of the rubber member to the float, and the installation member applies retaining forces to the installation section of the rubber member which securely dispose the rubber member on the float, and the retaining forces are spaced from the seal surface section of the rubber member along the axial direction of the float.

10. A float valve device as claimed in claim 9, wherein the rubber member has a substantially L-shaped cross-section.

11. A float valve device as claimed in claim 9, wherein the installation section of the rubber member is securely disposed between the float and the installation member.

12. A float valve device for a container containing liquid, comprising;

a valve body installed on an upper wall section of the container, the valve body including a communication passage for establishing communication between an inside and an outside of the container;

a valve mouth member fixedly disposed inside the communication passage and including a lower end section having a peripheral portion defining thereinside a valve opening which forms part of the communication passage;

a float disposed inside the valve body and movable relative to the valve opening in accordance with a level of liquid in the container;

a rubber member securely disposed at an upper section of the float, the rubber member having a sealing face which is substantially flat and contactable with the peripheral portion of the valve mouth member to close the valve opening upon ascension of the float, the rubber member being generally annular and including an annular installation section securely mounted on an upper section of the float, and an annular seal surface section integral with and located above the installation section, the seal surface section being located around the upper section of the float and comprising the sealing face; and a generally annular installation member disposed around the installation section of the rubber member to fix the installation section to the upper section of the float, the installation member being separate from and secured to the float, wherein the installation member is located so that an upper part of the seal surface section of the rubber member projects beyond the installation member toward the valve mouth member, and the seal surface section is located radially inwardly of the installation member, and wherein the rubber member is shaped such that the installation section is located radially outwardly relative to the seal surface section, and the installation member includes an annular upper section located over the installation section, and a generally cylindrical section, integral with the upper section, which is located radially outwardly from the installation section of the rubber member to surround the installation section, the upper section and the cylindrical section abutting the installation section of the rubber member.

* * * * *